United States Patent Office 2,819,250
Patented Jan. 7, 1958

2,819,250

CERTAIN OXAZOLINES, CERTAIN PENTOXAZOLINES, CERTAIN BIS-OXAZOLINES, AND CERTAIN BIS-PENTOXAZOLINES, AND METHOD OF MAKING SAME

Melvin De Groote, University City, Mo., assignor to Petrolite Corporation, Wilmington, Del., a corporation of Delaware No Drawing. Application September 23, 1953
Serial No. 381,979

10 Claims. (Cl. 260—53)

The present invention is concerned with processes involving reactions between certain hydroxylated amine compounds and certain carboxylated resins. Furthermore, it is concerned with the products so obtained and their uses in various industrial arts.

U. S. Patent No. 2,571,118, dated October 16, 1951, to De Groote and Keiser, describes a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

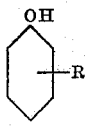

in which R is a hydrocarbon radical having at least 4 and not more than 14 carbon atoms and substituted in one of the positions ortho and para.

More specifically, the present invention is concerned with conversion of said carboxylated resins above described into substituted oxazolines and substituted pentoxazolines. In some instances two or more of such groups may be introduced into a single compound, thus yielding the comparable bis-compounds, or similar derivatives. For sake of simplicity and for purpose of delineating the structure, reference will be made to similar compounds derived from comparatively simple acids, for instance, monocarboxy acids having 9 to 21 carbon atoms. Thus, as stated in U. S. Patent No. 2,329,619, dated September 14, 1943, to Jayne, et al., the substituted oxazolines and pentoxazolines produced in accordance with the present invention may be represented by the following general formulae:

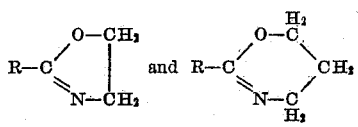

Formula 1 above represents a mu-substituted oxazoline in which R stands for a radical which is part of a phenolic resin as described. In some instances the hydrogens on the alpha and beta carbon atoms may be replaced by alkyl, aralkyl, aryl, cycloaliphatic, or similar radicals.

Formula 2 represents a mu-substituted pentoxazoline in which R is the same as in Formula 1. Likewise, in some instances the hydrogens on the alpha, beta and gamma carbon atoms may be replaced by alkyl, aralkyl, aryl, cycloaliphatic, or similar radicals.

Bis-oxazolines obtained, for example, from dibasic acid, such as the Diels-Alder adduct, are described in U. S. Patent No. 2,547,497, dated April 3, 1951, to Rowland. The formula is there described in the following manner:

"The bis-azolines which react with the Diels-Alder adducts have the general formula

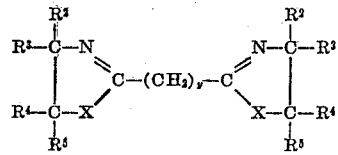

in which y is an integer of value 4 to 8 inclusive; X represents an atom of oxygen; and the characters $R^2$, $R^3$, $R^4$ and $R^5$ represent hydrogen atoms, or monovalent organic radicals."

The ring compounds above described can be obtained by a variety of methods. In the present instance the products are used largely as an intermediate for subsequent reaction with an alkylene oxide having not over 4 carbon atoms, or as an additive in an anti-corrosion product. In such instances color is not important or the presence of a small amount of unreacted initial materials, or the like. For this reason, although any method of preparation which has been described in the literature may be employed, I prefer to use the comparatively simple process of reacting an appropriate hydroxylated primary amine with the acidic reactant.

For purpose of convenience, what is said hereinafter will be divided into four parts:

Part 1 is concerned with the preparation of the carboxylated resins;

Part 2 is concerned with suitable amines which may be employed as reactants;

Part 3 is concerned with derivatives of the kind previously described, obtained by reaction between the two preceding classes of reactants in various molal ratios, and Part 4 is concerned with the uses for the reaction products in the manner described in Part 3, preceding.

PART 1

U. S. Patent No. 2,571,118, dated October 16, 1951, to De Groote and Keiser, describes a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

in which R is a hydrocarbon radical having at least 4 and not more than 14 carbon atoms and substituted in one of the positions ortho and para.

The present invention is concerned with the use of such carboxyl-containing resins obtained from a reactant mixture in which 1 to 2 moles of salicylic acid are used in conjunction with 3 to 5 moles of a substituted phenol as described. In most instances the preferred mixture involves a 3:2 or 4:1 molal ratio of substituted phenol to salicylic acid.

Assuming one used 4 moles of amylphenol and one mole of salicylic acid, the resin in its simplest aspect may be represented in an idealized form in the following manner:

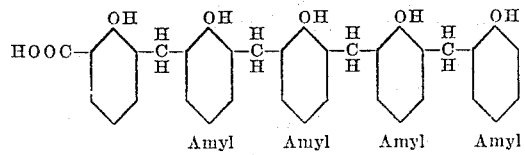

The above formula is, of course, an idealized structure, for obvious reasons, because the salicylic acid nucleus presumably can appear at any point in the resin molecule. Such resin, or for that matter, a resin having an increased number of salicylic acid radicals, can be oxyalkylated in the same manner as other phenol-aldehyde resins.

If obtained from 2 moles of salicylic acid and 3 moles of amylphenol the corresponding idealized formula would be thus:

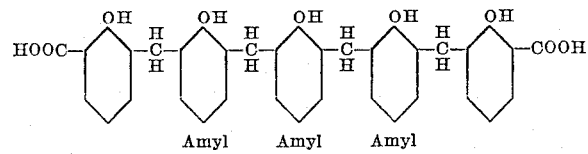

As to the preparation of such resins, purely by way of illustration certain examples are repeated substantially in verbatim form as they appear in said aforementioned U. S. Patent No. 2,571,118. In said patent there is reference to an example which illustrates resinification without use of salicylic acid. For continuity of text this example obviously is included.

*Example 1aa*

| | Grams |
|---|---|
| Para-tertiary butylphenol | 150 |
| Formaldehyde, 37% | 81 |
| Concentrated HCl | 1.5 |
| Monoalkyl ($C_{10}$–$C_{20}$, principally $C_{12}$–$C_{14}$ benzene monosulfonic acid sodium salt) | 0.8 |
| Xylene | 100 |

Examples of alkylaryl acids which serve as catalysts and as emulsifiers particularly in the form of sodium salts, include the following

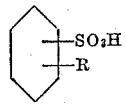

R is an alkyl hydrocarbon radical having 12–14 carbon atoms.

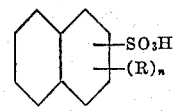

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. I have found equally effective and interchangeable the following specific sulfonic acids, or their sodium salts. A mixture of di- and tripropylated naphthalene monosulfonic acid; diamylated naphthalene monosulfonic acids; and nonyl naphthalene monosulfonic acid.

The equipment used was a conventional two-piece laboratory resin pot. The cover part of the equipment had four openings; one for reflux condenser, one for the stirring device, one for a separatory funnel or other means of adding reactants; and a thermometer well. In the manipulation employed the separatory funnel insert for adding reactants was not used. The device was equipped with a combination reflux and water-trap apparatus, so that the single piece of equipment could be used as either a reflux condenser or a water trap, depending upon the position of the three-way glass stop-cocks. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot, above described. This particular phenol was in the form of a flaked solid. Heat was applied, with gentle stirring, and the temperature was raised to 80–85° C., at which point a mild exothermic reaction took place. This reaction raised the temperature to approximately 105–110° C. The reaction mixture was then permitted to reflux at 100–105° C. for between one and one-and-one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. We have removed also the solvent by conventional means, such as evaporation, distillation, or vacuum distillation, and we customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol in presence of a strong mineral acid as a catalyst and using formaldehyde, sometimes yields a resin which apparently has a very slight amount of cross-linking. Such resin is similar to the one described above, except that it is sometimes opaque, and its melting point is higher than the one described above and there is a tendency to cure. Such a resin generally is dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience due to better solubility in xylene, I prefer to use a clear resin, but if desired, either type may be employed. (See Example 1a of aforementioned Patent No. 2,571,118.)

Example 2aa

| | | |
|---|---|---|
| Para-tertiary nonylphenol (3.0 moles) | grams | 660 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 41.2% xylene.

The solvent-free resin was pale reddish amber in color, xylene-soluble, clear, and quite soft in consistency.

(See Example 18a of aforementioned Patent 2,571,118.)

Example 3aa

| | | |
|---|---|---|
| Para-tertiary amylphenol (4.0 moles) | garms | 656 |
| Salicylic acid (1.0 mole) | do | 138 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained, contained approximately 45% xylene. The solvent-free resin was reddish amber in color, slightly opaque, obviously xylene-soluble, and somewhat hard to pliable in consistency. (See Example 7a of aforementioned Patent 2,571,118.)

Example 4aa

| | | |
|---|---|---|
| Para-tertiary amylphenol (3.0 moles) | grams | 492 |
| Salicylic acid (2.0 moles) | do | 276 |
| Formaldehyde 37% (5.0 moles) | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution so obtained contained approximately 48.8% xylene. The solvent-free resin was reddish amber in color, clear, xylene-soluble and semi-soft or pliable in consistency. (See Example 13a of aforementioned Patent 2,571,118.)

Example 5aa

| | | |
|---|---|---|
| Para-secondary butylphenol (3.0 moles) | grams | 450 |
| Salicylic acid (2.0 moles) | do | 276 |
| Formaldehyde 37% (5.0 moles) | do | 405 |
| HCl (concentrated) | ml | 40 |
| Xylene | grams | 700 |
| Dodecyl toluene monosulfonic acid sodium salt | grams | 3 |

The same procedure was followed as in Example 1aa, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency. (See Example 14a of aforementioned Patent 2,571,118.)

Example 6aa

| | | |
|---|---|---|
| Para-octylphenol (3.0 moles) | grams | 618 |
| Salicylic acid (2.0 moles) | do | 276 |
| Formaldehyde 37% | do | 405 |
| Xylene | do | 700 |
| HCl (concentrated) | ml | 40 |
| Dodecyl toluene monosulfonic acid sodium salt | grams | 3 |

The same procedure was followed as in Example 1aa, preceding, except that the reflux period was 5 hours instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency. (See Example 16a of aforementioned Patent 2,571,118.)

Example 7aa

| | Grams |
|---|---|
| Para-tertiary amylphenon (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed the procedure was changed slightly from that employed in Example 1aa. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water or slightly above, i. e., 100°–110° C., before distilling out water. The amount of water distilled out was 102 cc.

The resin solution so obtained contained approximately 41.2% xylene. The solvent-free resin was reddish-black, clear, xylene-soluble and hard but not brittle in consistency.

(See Example 19a of aforementioned U. S. Patent No. 2,571,118.)

PART 2

The most suitable amine is monoethanolamine. As to the description of amines, reference is made to aforementioned U. S. Patent No. 2,329,619. Indeed, the subsequent text is in substantially verbatim form as it appears in said patent.

In place of monoethanolamine any 1:2 monohydroxy monoamine alkylolamine may be used to obtain an alpha or beta-substituted oxazoline. Or a 1:3 alkylolamine may be used to obtain a mu-alkyl pentoxazoline, such as

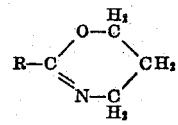

The 1:2 and 1:3 alkylolamines mentioned above refer to alkylolamines having at least one hydroxy group and at least one primary amino group located in the 1:2 or the 1:3 positions.

Structurally suitable 1:3-alkylolamines may be represented as follows:

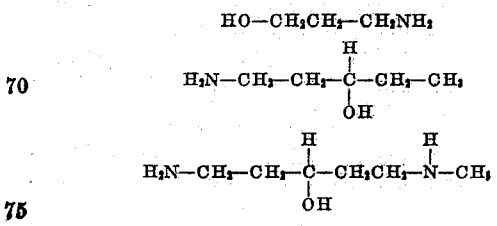

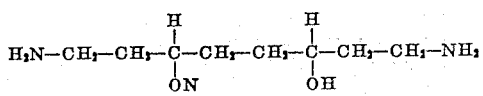

Suitable 1:2-alkylolamines are structurally similar to the 1:3-alkylolamines, the only difference being that the hydroxyl and the primary amino groups are in the 1:2-positions as follows:

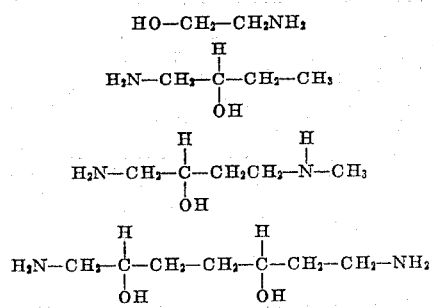

In the above formulae it is readily seen that the only essential groupings are the hydroxyl group and a primary amino group situated in either the 1:2-positions or the 1:3-positions. In addition to these essential groupings the alkylol-amines may have additional groupings present. These additional groupings may be a simple alkylene chain or they may be an alkylene chain containing hydroxy groups as well as secondary or tertiary amino groups. In some cases suitable alkylolamines may contain a plurality of groups having a hydroxy group and a primary amino group in either the 1:2 or the 1:3-positions, said groups being separated from one another by an alkylene chain. In this type of alkylolamine it may be possible to utilize those having one group made up of 1:2-hydroxy primary amino group separated by an alkylene chain from a group having a hydroxy and a primary amino group in the 1:3-positions. In these latter types of alkylolamines it may be possible to produce compounds having a plurality of oxazoline rings or a compound having an oxazoline ring and a pentoxazoline ring.

Monoethanolamine is the preferred alkylolamine because of its cheapness and ready availability. It should be distinctly understood, however, that the monoethanolamine may be replaced in all or part by other primary alkylolamines as hereinafter described. Representative alkylolamines include those such as: monoisopropanolamine, mono-n-propanolamine, 2-amino-1-butanol, 2-amino-2-methyl propanol, 2-amino-1-hexanol, 2-amino-2-methyl 1,3-propanediol, 2-amino-1-butanol, and the like. Other reactants having as many as 7 carbon atoms or more in a single group include 2-amino-4-pentanol, 2-amino-4-hexanol, 2-amino-3-heptanol, and the like.

Attention is directed to certain reactants above noted in which there are two reactive groups per molecule which may combine to yield the desired ring. Other similar compounds can be obtained by reacting 2-amino-2-methyl-1,3-propanediol, 2-amino-2-ethyl-1,3-propanediol and tris-(hydroxymethyl)-aminomethane so as to produce diamines in which two terminal hydroxyls have been converted into an ether radical, or an equivalent divalent bridge radical.

PART 3

The reactions involving the formation of oxazolines and pentoxazolines are well known. They have been described in a large number of patents. The addition of the amine presumably first forms a salt corresponding to the carboxy radical. It is probable on heating the next step is conversion into an amide. In a general way, amide formation seems to take place around 150° to 200° C., or thereabouts. At higher temperatures, particularly in the range of 210° to 250° C. one obtains ring closure with the formation of compounds of the kind herein described. Numerous examples appear subsequently.

It is to be noted that the carboxylated resins may be monofunctional, difunctional or even may contain three or more carboxyl groups. For practical purposes the preferred resin contains one or two carboxy groups. A carboxylated resin having one carboxyl group may be reacted with a suitable amine having a single amine group as in the case of monoethanolamine or may have two reactive groups as in the case of

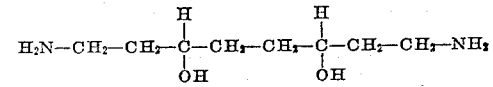

In a 1:1 ratio only a single ring is formed in the latter instance. However, if two moles of a monocarboxylated resin are employed obviously a compound having 2 rings could be formed from the diamino compound above depicted. Other polyamino compounds may be employed notwithstanding the fact that they are simply mono-functional for the purpose of ring formation, such as compound of the following type:

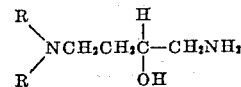

where R is a hydrocarbon radical having up to 20 or more carbon atoms.

What has been said in respect to the monocarboxylated resins applies, of course, in respect to the dicarboxylated resins with an additional variant, to wit, that a diamino compound of the kind previously described may act as a divalent bridge to form initial linear polymers and then cause cross-linking or some more complicated structure. For instance, soluble complicated resins have been obtained using dicarboxylated resins and compounds comparable to the reactive diamines described previously. Furthermore reactive residual hydroxyl groups may enter into complicated resinous reactions.

There has been presented earlier an idealized formula of the carboxylated resin. Without attempting to include all the ramifications and particularly where polyamines are involved, it becomes apparent that in the use of the simple monoamino reactant the radical which has previously been shown thus

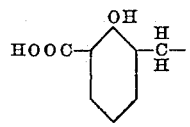

becomes in essence

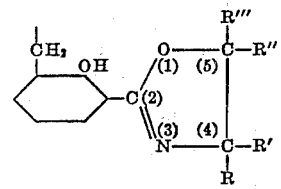

in which R, R', R'' and R''' may represent hydrogen, methyl or any one of a number of other groups previously illustrated.

The compounds can be prepared without the use of any solvent although for obvious reasons it is preferable that a solvent be used. Indeed, it is specified that the resins employed be xylene-soluble. In every instance xylene was used as a solvent but obviously any other comparable solvent such as ethylbenzene, cymene, or the like, can be employed. However xylene seems to be very suitable.

The general procedure was to dissolve the resin in xylene as indicated and then add the amine using a reflux condenser with a phase-separating trap. The reaction was conducted for a period of time at a comparatively low temperature, for instance, under the boiling point of the amine so as to first form the salt and then the amide. This avoided any loss of the amine if volatile.

It is necessary to conduct the reaction so there is no loss of amine. As the amide begins to form, water of reaction appears which can be eliminated by means of a phase-separating trap. The amide forms at a somewhat lower temperature as noted previously, and in most instances at 165° C. Using xylene and a phase-separating trap, the ring compounds may be formed at a comparatively low temperature, in some instances at approximately 170° C. and in other instances at a higher temperature, such as 210° C. However, in the majority of cases a temperature between 200° and 250° C. is employed, along with a phase-separating trap and xylene as a solvent. The temperature is controlled simply by eliminating the xylene by means of the phase-separating trap so the amount of water obtained approximates theoretical. The entire procedure is conventional and has been described in a number of patents in conjunction with reactants other than the carboxylated resins.

One example which appears in the table is Example 2A and specifically this example was prepared in the following manner (Example 1A appears in the table).

Example 2A 127 grams of the amylphenol-salicylic acid formaldehyde resin, molal ratio 3:2:5 (Example 4aa), 67 grams of xylene and 18.3 grams of ethanolamine were heated together in the equipment previously described, to a temperature of 150° C., at which temperature water began to distill off into the phase-separating trap. The temperature was held at approximately 150° C. for about 9 hours at which time about one-half the theoretical amount of water had been collected in the water-trap. Xylene was removed and the temperature rose to 200° C. and the reaction was held at 200° to 205° C. for about an additional 20 hours. At the end of this time the theoretical amount of water was collected.

The method of reaction depends essentially on using a temperature (usually in the presence of a solvent such as xylene), which is above amidification temperature and below the pyrrolytic point of either the reactants or the products of reaction.

In the table immediately following a number of other examples appear illustrating the preparation of these compounds, in which the mol. ratio represents the molal ratio of resin to amine.

into the acetate. The salt can be mixed with water to give a milky suspension. Similarly, the carbitol solution can be combined with an acid, such as acetic acid, hydroxyacetic acid, gluconic acid, etc., to give greater solubility in water.

PART 4

The products above obtained may be used for the various purposes in which comparable compounds have been used in the various arts. For instance, they may be used for numerous purposes as pointed out in connection with the oxazolines described in U. S. Patent No. 2,416,552, dated February 25, 1947, to Valko. Thus, the new substances obtained in accordance with this invention can be used in solid or liquid form or as aqueous and non-aqueous solutions alone or mixed with other materials. In addition to the already mentioned uses, they can be employed with benefit in cleaning, filling, sizing, desizing, impregnating, mercerizing, delustering, degumming, stripping, felting, oiling, dyeing and printing of natural and synthetic textile materials as wool, cotton, silk, rayon, etc. They are further useful as plasticizers for natural and synthetic rubbers and resins.

These compounds may be employed as additives to demulsifying agents, particularly demulsifying agents employed in conjunction with concentrated hydrochloric acid. They may be used as corrosion inhibitors or rust preventives, particularly in combination with chromium compounds as described in U. S. Patent No. 2,450,807, dated October 5, 1948, to McCarthy.

They may be used as anti-stripping agents in connection with asphalt.

In some instances they are effective for the resolution of petroleum emulsions of the oil-in-water type.

The most important use, however as far as I am aware, aware, is as an intermediate.

The above products can be subjected to oxyalkylation, particularly with an alkylene oxide having not over 4 carbon atoms such as ethylene oxide, butylene oxide, propylene oxide, glycide methylglycide, etc., to produce a variety of materials, some of which are extremely hydrophile, others which show hydrophile-hydrophobe balance, particularly if ethylene oxide is used in combination with butylene oxide or propylene oxide.

TABLE I

| Ex. No. | Resin, Ex. No. | Mol. ratio | Mol. wt. | Amine | Wt. of amine, gms. | Solvent (xylene) at start | Time, hrs. | Max. temp., °C. | Water out, ml. |
|---|---|---|---|---|---|---|---|---|---|
| 1A | 4aa | 1:1 | 846 | Ethanolamine | 61 | 272 | 15 | 210 | 36 |
| 2A | 4aa | 1:2 | 846 | do | 122 | 290 | 20 | 205 | 72 |
| 3A | 4aa | 1:1 | 846 | Isopropanolamine | 75 | 276 | 25 | 240 | 36 |
| 4A | 4aa | 1:2 | 846 | do | 150 | 299 | 30 | 240 | 72 |
| 5A | 4aa | 1:1 | 846 | Butanolamine | 89 | 280 | 15 | 250 | 36 |
| 6A | 4aa | 1:2 | 846 | do | 78 | 277 | 18 | 250 | 72 |
| 7A | 4aa | 1:1 | 846 | 2-amino-2-ethyl 1,3-propanediol | 120 | 290 | 26 | 173 | 36 |
| 8A | 4aa | 1:2 | 846 | do | 240 | 326 | 34 | 208 | 72 |
| 9A | 4aa | 1:1 | 846 | Tris(hydroxymethyl) aminomethane | 121 | 290 | 25 | 215 | 36 |
| 10A | 4aa | 1:2 | 846 | do | 242 | 326 | 25 | 219 | 72 |
| 11A | 3aa | 1:1 | 872 | Ethanolamine | 61 | 311 | 20 | 205 | 36 |
| 12A | 3aa | 1:1 | 872 | Isopropanolamine | 75 | 315 | 30 | 225 | 36 |
| 13A | 3aa | 1:1 | 872 | Butanolamine | 89 | 320 | 25 | 240 | 36 |
| 14A | 6aa | 1:1 | 972 | Ethanolamine | 61 | 344 | 21 | 210 | 36 |
| 15A | 6aa | 1:1 | 972 | Isopropanolamine | 75 | 349 | 25 | 230 | 36 |
| 16A | 6aa | 1:1 | 972 | Butanolamine | 89 | 354 | 25 | 245 | 36 |
| 17A | 2aa | 1:2 | 1,014 | Ethanolamine | 122 | 378 | 25 | 210 | 72 |
| 18A | 2aa | 1:2 | 1,014 | Isopropanolamine | 150 | 388 | 25 | 233 | 72 |
| 19A | 2aa | 1:2 | 1,014 | Butanolamine | 178 | 397 | 30 | 250 | 72 |

The products obtained in the manner herein described are dark red resinous compounds. When the solvent is eliminated they are invariably brittle solids, or in a few instances apparently thick tacky liquids, which are also almost solid in nature. The are solvent-soluble in most instances although not infrequently an oxygenated solvent, or an oxygenated solvent in mixture with a hydrocarbon solvent, can be used. In most cases an excellent solvent is diethyleneglycol monoethyl ether.

The brittle solids can be ground to a fine powder, wetted with acetic acid and heated so as to be converted The compounds so obtained are extremely useful for the resolution of petroleum emulsions of the water-in-oil type. All that is required is to follow the procedure set forth in U. S. Patent No. 2,636,038, dated April 21, 1953, to Brandner.

The compounds herein described can be reacted with diepoxides so as to form a more complex molecule and then reacted with monoepoxides as above described to give additional products useful for various purposes and particularly the resolution of petroleum emulsions of the water-in-oil type.

Having thus described my invention what I claim as new and desire to secure by Letters Patent, is:

1. Compounds selected from the group consisting of oxazolines and pentoxazolines formed by the reaction of an alkanolamine with the carboxyl group of a carboxylated resin; said carboxylated resin being a fusible, carboxyl-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

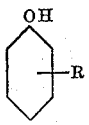

in which R is a hydrocarbon radical having at least 4 and not more than 14 carbon atoms and substituted in one of the positions ortho and para with the proviso that the amine which is the source of the oxazoline and pentoxazoline radicals be selected from the group consisting of alkylolamines having a hydroxy group and a primary amino group in a 1:2 position, and alkylol amines having a hydroxy group and a primary amino group in a 1:3 position.

2. The product of claim 1 with the proviso that the resin molecule have approximately 5 phenolic nuclei, of which not over 2 are obtained from salicylic acid.

3. The product of claim 1 with the proviso that the phenolic resin have approximately 5 phenolic nuclei, of which 2 are obtained from salicylic acid.

4. The product of claim 1 with the proviso that the phenolic resin have approximately 5 phenolic nuclei, of which 2 are obtained from salicylic acid, and with the further proviso that the molal ratio of amine reactant to carboxylated resin be 2:1.

5. The product of claim 1 with the proviso that the phenolic resin have approximately 5 phenolic nuclei, of which 2 are obtained from salicylic acid, with the further proviso that the molal ratio of amine reactant to carboxylated resin be 2:1, and with the additional proviso that the amine reactant contain only one nitrogen atom.

6. The product of claim 1 with the proviso that the phenolic resin have approximately 5 phenolic nuclei, of which 2 are obtained from salicylic acid, with the further proviso that the molal ratio of amine reactant to carboxylated resin be 2:1, and with the additional proviso that the amine reactant be monoethanolamine.

7. The product of claim 1 with the proviso that the phenolic resin have approximately 5 phenolic nuclei, of which 2 are obtained from salicylic acid, with the further proviso that the molal ratio of amine reactant to carboxylated resin be 2:1, and with the additional proviso that the amine reactant be monoisopropanolamine.

8. The product of claim 1 with the proviso that the phenolic resin have approximately 5 phenolic nuclei, of which 2 are obtained from salicylic acid, with the further proviso that the molal ratio of amine reactant to carboxylated resin be 2:1, and with the additional proviso that the amine reactant be monobutanolamine.

9. The product of claim 1 with the proviso that the phenolic resin have approximately 5 phenolic nuclei, of which 2 are obtained from salicylic acid, with the further proviso that the molal ratio of amine reactant to carboxylated resin be 2:1, and with the additional proviso that the amine reactant be 2-amino-2-ethyl-1,3-propanediol.

10. The product of claim 1 with the proviso that the phenolic resin have approximately 5 phenolic nuclei, of which 2 are obtained from salicylic acid, with the further proviso that the molal ratio of amine reactant to carboxylated resin be 2:1, and with the additional proviso that the amine reactant be tris(hydroxymethyl)aminomethane.

References Cited in the file of this patent

UNITED STATES PATENTS

| | | |
|---|---|---|
| 2,329,619 | Jayne | Sept. 14, 1943 |
| 2,416,552 | Valko | Feb. 25, 1947 |
| 2,571,118 | De Groote | Oct. 16, 1951 |
| 2,743,241 | De Groote | Apr. 24, 1956 |